United States Patent [19]

Womack

[11] 4,077,311
[45] Mar. 7, 1978

[54] FOOD ROASTING OR BOILING APPARATUS AND METHOD

[75] Inventor: Kenneth L. Womack, Miami, Fla.

[73] Assignee: The Pillsbury Company, Minneapolis, Minn.

[21] Appl. No.: 760,494

[22] Filed: Jan. 19, 1977

[51] Int. Cl.² ............................................. A47J 37/00
[52] U.S. Cl. ....................................... 99/355; 99/386; 99/443 C; 198/635
[58] Field of Search .................. 99/355, 386, 387, 404, 99/407, 443 C; 198/635, 637; 426/389; 126/41 C; 219/388 C; 34/117, 120

[56] References Cited

U.S. PATENT DOCUMENTS

| | | | |
|---|---|---|---|
| 1,580,684 | 4/1926 | Schedigger | 99/404 |
| 2,238,309 | 4/1941 | Cramer | 99/386 |
| 2,527,687 | 10/1950 | Stock | 99/407 |
| 2,576,633 | 11/1951 | Naylor | 198/635 |
| 3,202,260 | 8/1965 | Wolf | 198/635 |
| 3,267,836 | 8/1966 | Yepis | 99/404 |
| 3,646,879 | 3/1972 | Palmason | 99/386 |
| 3,721,178 | 3/1973 | Szabrak | 99/386 |

*Primary Examiner*—Billy J. Wilhite
*Attorney, Agent, or Firm*—James V. Harmon; Michael D. Ellwein

[57] ABSTRACT

A spring or weight loaded blade or scraper element e.g. in the form of a wire rides up and down over the cross wires of the conveyor of a food roaster between the conveyor and a food product repeatedly striking the lower side of the food thereby joggling the food product to separate it from the conveyor.

The invention is particularly useful in a meat broiler such as a hamburger broiler since hamburgers frequently stick to portions of the conveyor chain.

4 Claims, 4 Drawing Figures

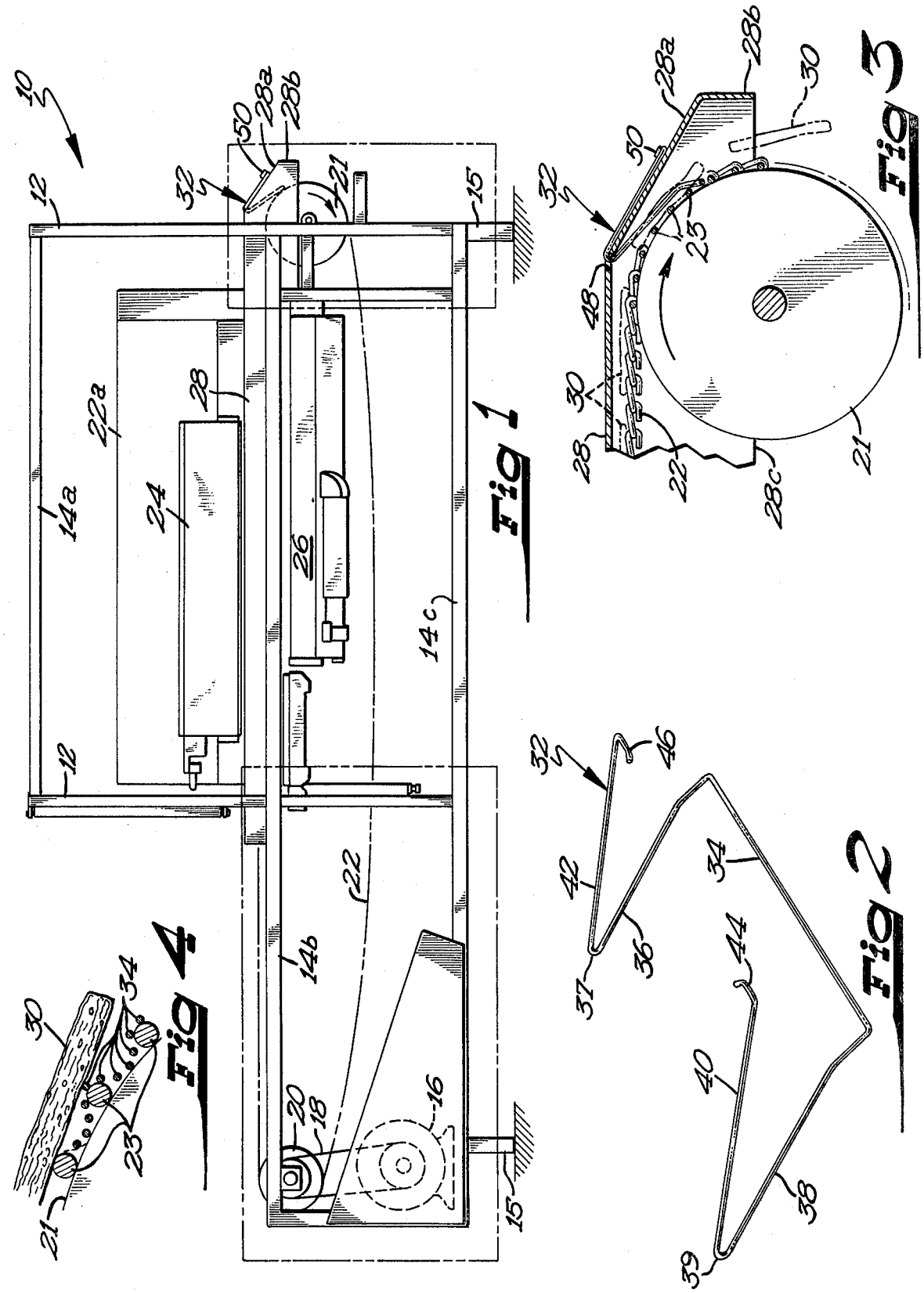

FOOD ROASTING OR BOILING APPARATUS AND METHOD

FIELD OF THE INVENTION

The invention relates to food preparation and more particularly to food cooking, broiling or roasting.

THE PRIOR ART

When food such as meat is roasted in a conveyorized broiler it often becomes stuck to the conveyor. A system previously employed in conveyorized food broilers for separating hamburger or other food where it sticks to the conveyor is composed of an inclined chute at the outlet end of the machine with a sharpened edge i.e. knife edge pointed against the direction of conveyor movement. The knife edge at the upper end of the chute was pressed firmly against the conveyor by means of a screw element such as a turnbuckle. The chute remained stationary during operation and as the conveyor carried the hamburgers through the broiler, the chute would pass between the hamburgers and the conveyor thereby separating the hamburgers from the conveyor.

This system had several shortcomings. First, pieces of meat clinging to the wire elements of the conveyor were not very effectively removed. Moreover, the chute would occasionally tear up the hamburger. To prevent this, more pressure was applied with the turnbuckle and this produced excessive friction, overloading of motors and causing parts to wear. Furthermore, the scraper or chute would occasionally get caught in the chain thereby jamming it damaging the scraper and conveyor. This was usually the result of the sharpened edge of the chute becoming bent. In addition, the chute would usually jam the chain of the conveyor if a kitchen implement such as a pair of tongs became caught between the chain and the knife edge portion of the chute.

OBJECTS

The major objects are the provision of a good roasting and broiling apparatus with (a) an improved means for separating the food from the conveyor wherein a separating element rides up and down repeatedly over cross wires which form links of the conveyor, (b) the stripper element is able to fall between each of the cross wires and then ride up over the next wire to thereby strip small pieces of meat off each wire portion of the conveyor as the conveyor is advanced, (c) provision for the stripper to pass between the food product and the conveyor and repeatedly strike the lower surface of the food product thereby goggling it so as to separate it from the conveyor, (d) the apparatus will operate reliably over extended periods of time and is inexpensive to produce, (e) exhibits relatively little wear, (f) the stripper has little tendency to get caught in the conveyor during operation or to jam in the event a kitchen implement is present on the conveyor.

THE FIGURES

FIG. 1 is a side elevational view of an apparatus embodying the invention.

FIG. 2 is a perspective view of the separator or scraper as it appears when removed from the apparatus.

FIG. 3 is a partial longitudinal sectional view of the right end of the apparatus of FIG. 1 on a larger scale.

FIG. 4 is a partial longitudinal sectional view on a still larger scale showing the motion of the separator as it travels over portions of the conveyor during operation.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

SUMMARY OF THE INVENTION

The invention provides a conveyorized food cooking, roasting or broiling apparatus and method with a yieldedly biased separator or scraper having an elongated scraping member extending transversely of the conveyor and positioned between the conveyor and the food in the vicinity of the outlet end of the conveyor, preferably in the region where the foods carried by the conveyor falls from the end of the conveyor. The apparatus includes a supporting framework, an endless conveyor having a plurality of transversely extending spaced apart cross members or wires and a drive motor for imparting motion to the conveyor. In operation, the blade or scraping member rides up and down repeatedly over the cross members of the conveyor between the conveyor and the food thereby repeatedly striking the lower surface of the food product so as to joggle it and cause it to separate from the conveyor while at the same time scraping small pieces of food and ashes from the conveyor cross members.

The invention also includes a method of separating food products from an oven conveyor at points where the food product has become bonded to portions of the conveyor. The method comprises providing a separator element between the conveyor and the food product and repeatedly causing the separator element to rise and fall into spaces in the conveyor as it passes between the conveyor and the food product to repeatedly strike the lower surface of the food product causing the food product to bounce or joggle so as to separate it from the conveyor.

DETAILED DESCRIPTION

As seen in the figures, the apparatus indicated generally by the numeral 10 comprises a supporting framework composed of a set of vertical posts 12 and horizontal frame elements 14a, 14b and 14c on either side thereof (only those closest to the observer in FIG. 1 being shown) to form a metal framework which includes four legs 15 only two of which are shown. The broiler 10 includes an electric drive motor 16 coupled by means of a chain and sprocket assembly 18 to a conveyor including a lefthand conveyor drum 20, an endless conveyor 22 formed from wire, and idler drum 21 at the righthand side thereof, each of the drums being suitably journaled for rotation on its own horizontal axis. The conveyor as best seen in FIGS. 3 and 4 is of a chain-type and includes a plurality of horizontally disposed transversely extending and longitudinally spaced apart parallel cross members or wires 23 which comprise the center section of the links that make up a chain structure of the conveyor. Above the conveyor 22 is an oven controller 22a of any suitable known construction and a heating unit such as a gas burner 24. Below the upper run of conveyor 22 is a second gas burner 26 or other heating means which may include one or more separate burners. The controllers and burners per se form no part of the present invention.

Above the upper run of the conveyor 22 is a broiler top assembly or cover 28 which includes an upper wall positioned just above the conveyor chain 22, a downwardly bent end portion 28a near the right end thereof above the drum 21, a downwardly bent vertical portion 28b and a pair of laterally spaced vertical and parallel side walls 28c. During operation, the drive motor 16 turns drum 20 clockwise thereby driving the upper run of the conveyor 22 from left to right as seen in FIGS. 1, 3 and 4, carrying food such as hamburger patties 30 from left to right between the burners 24 and 26 and finally over the drum 21 at the outlet end of the machine where they fall to any suitable receiving surface (not shown).

A separator or scraper 32 is provided to engage the conveyor 22 in the vicinity of the outlet end of the apparatus as seen in FIG. 3 (the right end) and to pass between the conveyor 22 and each hamburger 30 as it approaches the outlet. The separator 32 is located in the general vicinity of the outlet end of the apparatus i.e. at or near the point where the hamburgers leave the conveyor as shown in FIG. 3 but preferably on the radius of the drum 21 at the outlet of the apparatus. The scraper 32 includes a transversely extending elongated scraping member 34 positioned generally horizontally and a pair of leg sections 36 and 38 extending generally at right angles to section 34. The cross member 34 has a smaller cross sectional size than the space between the wires 23 of the conveyor to thereby fit between them. The arm sections have bends 37 and 39 between them and sections 40 and 42 which in turn have retainer engaging hooks 40 and 46 at their free ends.

As shown in FIG. 3 each of the bends 37, 39 projects through an opening 48 (only one of which is shown) in the upper wall of the broiler top assembly 28. The hook portions 44, 46 are each engaged over a pin, rivet 50 or other retaining element to the wall 28a. Two laterally spaced apart retaining elements 50 are provided, one to receive each of hooks 44 and 46.

The scraper 32 can be formed from a resilient substance such as spring wire so that the elongated scraping member section 34 is yieldedly biased by the spring action of the legs 36, 38 downwardly against the drum 21 and conveyor cross members 23.

When the separator 32 is to be removed for cleaning, the hooks 44 and 46 are disengaged from retainers 50 and brought through the openings 48 after the drum 21 has been disconnected and lowered. If desired, the separator 32 can instead be mounted permanently in the position shown.

During operation as the conveyor 22 advances the hamburgers or other food product from left to right the scraping member 34 rises and falls repeatedly as shown in FIG. 4 between each of the cross members 23 thereby repeatedly striking the hamburger 30 on its lower surface just before it reaches the point where it can fall from the conveyor 22 at the righthand end of the apparatus so that if one looks upwardly from underneath the broiler top assembly 28 one can see the cross member repeatedly coming into contact with the lower surface of each hamburger 30 causing it to bounce or joggle thereby effectively separating it from the wire elements 23 of conveyor 22 while at the same time removing pieces of meat and ashes that have stuck to the conveyor cross wires.

While not being bound to any particular theory of operation, it appears that the bouncing or joggling of the food causes the food to flex which helps to separate it from the conveyor more effectively than when the food product is not subjected to a bouncing or joggling motion. While the separator 32 has been shown above the drum 21 it should be understood that it can be located anywhere in the general vicinity of the outlet end of the apparatus shown in FIG. 3 prior to the point where the hamburger would normally fall under the influence of gravity from the conveyor 22. It should not be far enough away from drum 21 so that the food can become reattached to the conveyor 22 by further cooking.

What is claimed is:

1. A food roasting or broiling apparatus comprising a supporting framework, a drive motor, an endless conveyor to convey the food from an inlet at one end of the apparatus to an outlet at the other end, said conveyor being coupled to the motor and mounted upon the framework, said conveyor being adapted to convey the food from one portion of the apparatus to another and having longitudinally spaced apart generally parallel cross members with spaces between them, a separator means including an elongated separator member for exerting a downward force against the upper surface of the conveyor in the vicinity of the outlet end of the apparatus means yieldly biasing the elongated separator member into contact with the conveyor, the separator member being of a smaller cross sectional size than the spaces between cross members of the conveyor to thereby fit into the spaces between the cross members of the conveyor, whereby when the conveyor is advanced the separator member will ride up and fall down repeatedly into the space between each of the cross elements of the conveyor and pass between the conveyor and the food in the general vicinity of the oulet end of the apparatus to thereby strike the food so as to joggle it away from the conveyor as the conveyor is advanced past the separator.

2. The apparatus of claim 1 wherein the separator means is a wire and the elongated member comprises a central portion of the wire, a pair of resilient legs extend from the ends of the elongated separator member and the free ends of the legs are connected to the apparatus whereby the resiliency of the legs yieldedly biases the separator member against the conveyor.

3. The apparatus of claim 2 wherein the separator means comprises an elongated wire scraper having a pair of legs joined by the elongated scraper member and integral therewith, bends are present at the upper ends of the legs, a pair of wire sections extends from the bends and each section terminates in a hook connected to said apparatus.

4. The apparatus of claim 3 wherein the hooks are engaged over a pair of laterally spaced apart retaining elements mounted on the apparatus above the conveyor.

* * * * *

UNITED STATES PATENT OFFICE
CERTIFICATE OF CORRECTION

Patent No. 4,077,311                 Dated March 7, 1978

Inventor(s) Kenneth L. Womack

It is certified that error appears in the above-identified patent and that said Letters Patent are hereby corrected as shown below:

On the cover page, title of the invention should read:

-- FOOD ROASTING OR BROILING APPARATUS AND METHOD --.

Signed and Sealed this

Twenty-seventh Day of June 1978

[SEAL]

Attest:

RUTH C. MASON
*Attesting Officer*

DONALD W. BANNER
*Commissioner of Patents and Trademarks*